United States Patent [19]

Favalora

[11] Patent Number: 5,204,499
[45] Date of Patent: Apr. 20, 1993

[54] SNAP-IN CONNECTOR WITH INTEGRAL SPRING

[75] Inventor: Mark L. Favalora, Niantic, Conn.

[73] Assignee: Hubbell Incorporated, Orange, Conn.

[21] Appl. No.: 695,696

[22] Filed: May 3, 1991

[51] Int. Cl.$^5$ .............................................. H02G 3/22
[52] U.S. Cl. ............................ 174/65 R; 174/153 R; 285/162; 285/921
[58] Field of Search ............ 174/153 R, 65 R, 153 G, 174/65 G, 152 G; 248/27.1, 27.3; 16/108; 285/162, 161, 194, 205, 206, 207, 210, 319, 921

[56] References Cited

U.S. PATENT DOCUMENTS

| | | | |
|---|---|---|---|
| 1,215,595 | 2/1917 | Weikert et al. | 285/158 |
| 2,093,038 | 3/1935 | Douglas | 248/27 |
| 3,154,281 | 2/1962 | Frank | 248/201 |
| 3,183,297 | 10/1962 | Curtiss | 174/65 |
| 3,659,880 | 5/1972 | Goldsobel | 285/161 |
| 3,814,467 | 6/1974 | Van Buren, Jr. | 285/92 |
| 3,858,151 | 12/1974 | Paskert | 339/14 R |
| 3,993,333 | 11/1976 | Biswas | 285/45 |
| 4,012,578 | 3/1977 | Moran et al. | 174/51 |
| 4,021,604 | 5/1977 | Dola et al. | 174/51 |
| 4,032,178 | 6/1977 | Neuroth | 174/65 R X |
| 4,103,101 | 7/1978 | Maier | 174/65 |
| 4,220,808 | 9/1980 | Fujita | 248/27.3 X |
| 4,248,131 | 2/1981 | Larro | 411/15 |
| 4,468,535 | 8/1984 | Law | 174/65 R |
| 4,632,435 | 12/1986 | Polyak | 285/921 X |
| 4,864,080 | 9/1989 | Fochler et al. | 174/65 |
| 4,880,387 | 11/1989 | Stikeleather et al. | 439/98 |

FOREIGN PATENT DOCUMENTS 2065812 7/1981 United Kingdom .............. 285/161

Primary Examiner—Leo P. Picard
Assistant Examiner—Hyung S. Sough
Attorney, Agent, or Firm—Jerry M. Presson; Alfred N. Goodman

[57] ABSTRACT

A connector for coupling an electrical conduit in an aperture in a support having a wall of variable thickness. The connector includes a body member having resilient legs with locking tongues on one end and a conduit retaining formation on the other end, and a frusto-conical spring coupled to the body member. The spring is integrally coupled to the body member between the locking tongues and retaining formation. The connector is sealingly engaged with the support by engagement of the spring on one side of the support and engagement of the locking tongues on the other side.

25 Claims, 2 Drawing Sheets

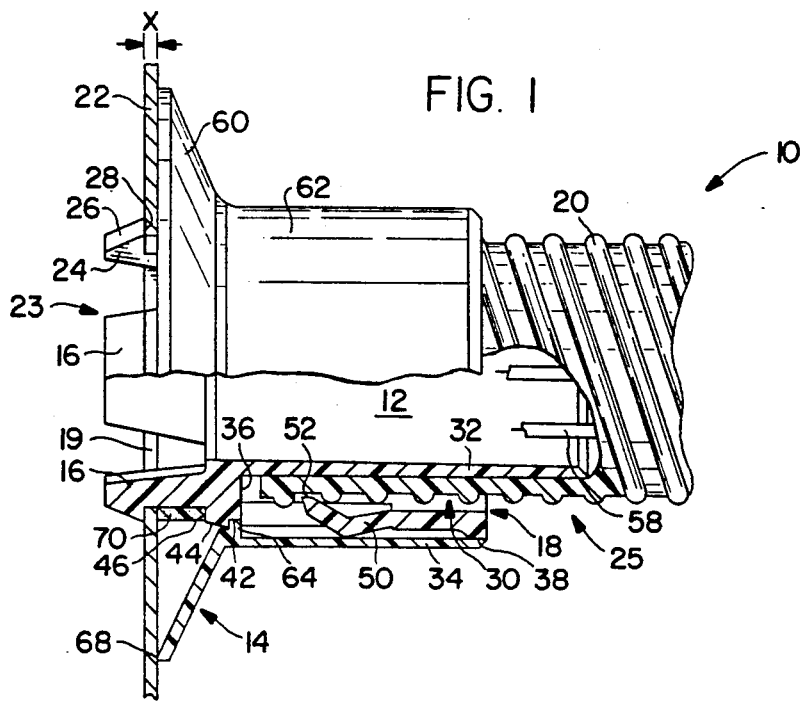
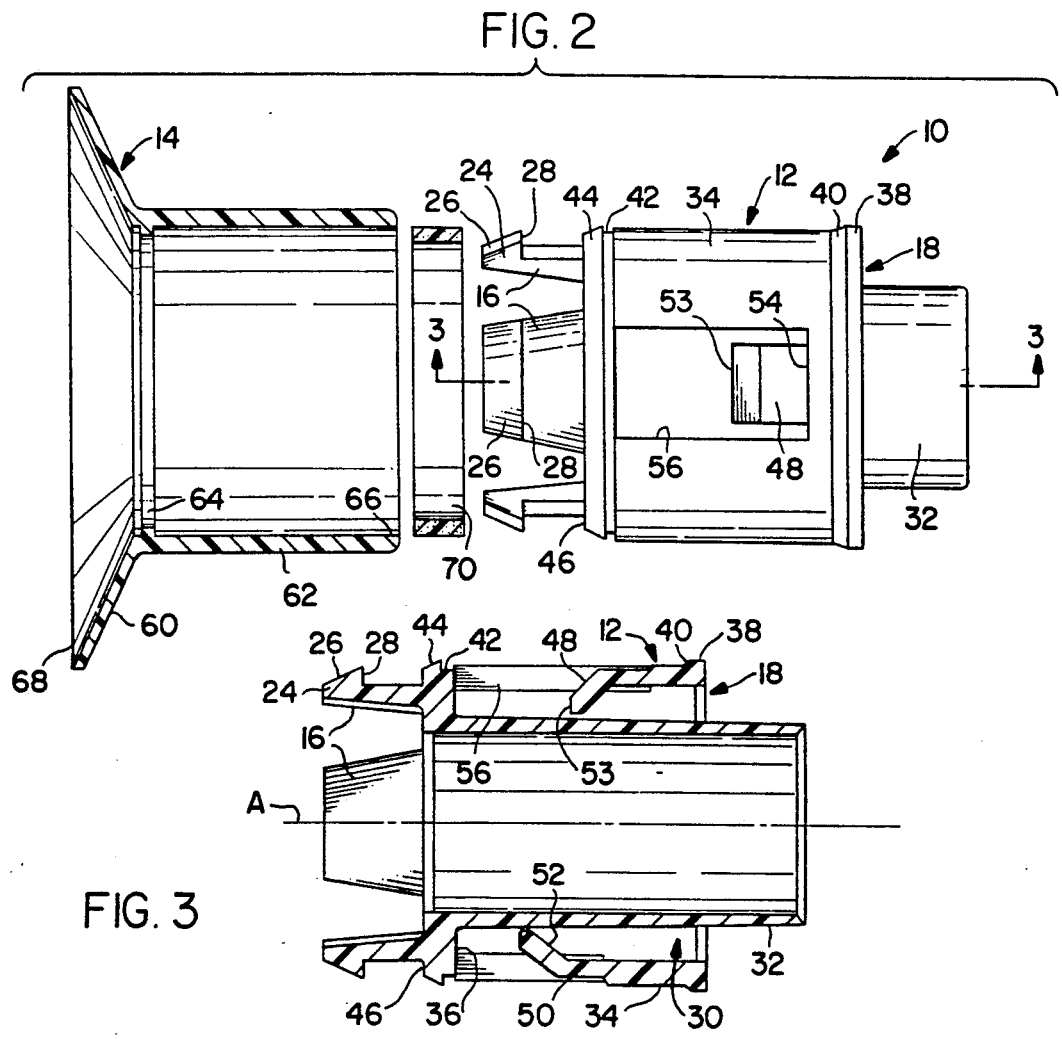

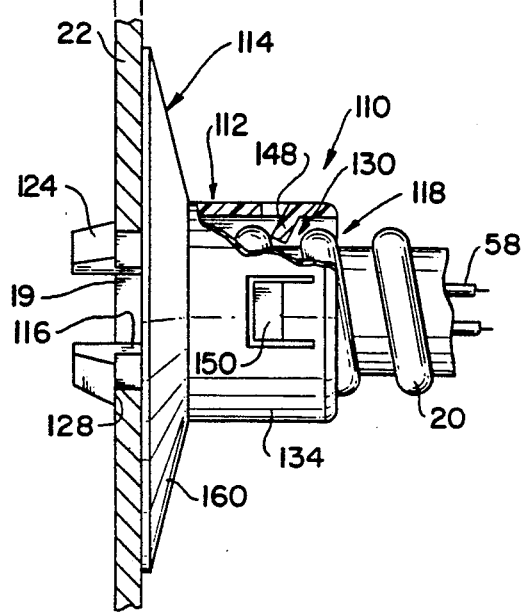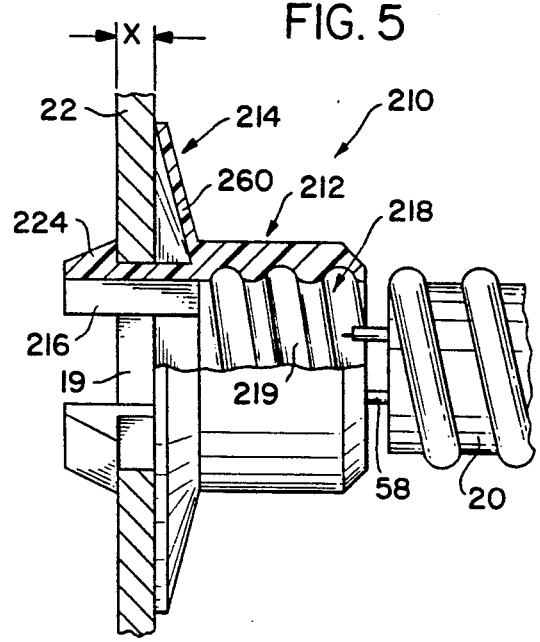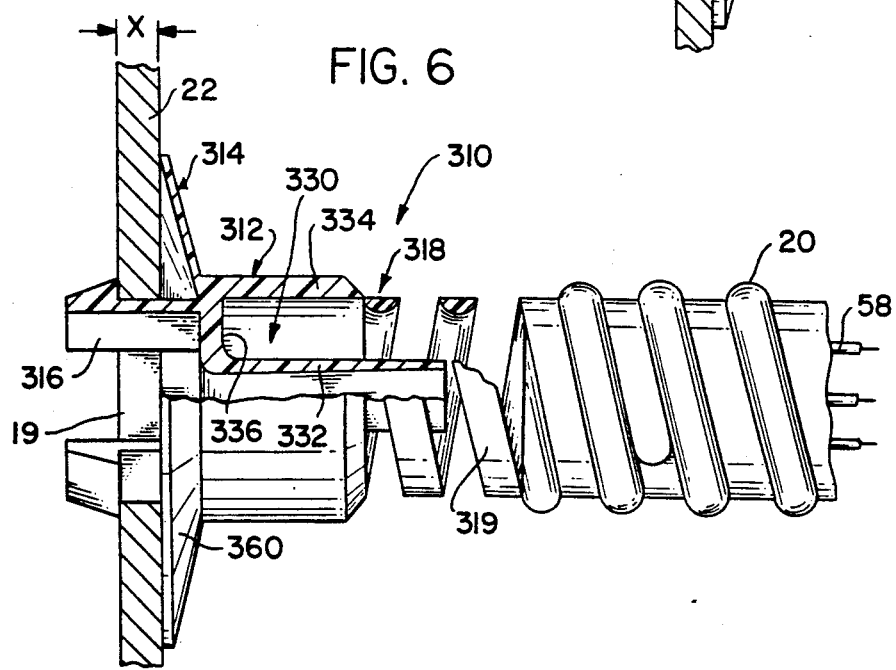

SNAP-IN CONNECTOR WITH INTEGRAL SPRING

FIELD OF THE INVENTION

The invention relates to a connector for coupling an electrical conduit to a support. More particularly, the invention relates to a connector having a tubular body member with a plurality of resilient legs with locking tongues on one end and a retaining formation for retaining the electrical conduit on the other end. A spring, coupled to the body member between its ends, engages one side of the support and biases the locking tongues against the other side of the support.

BACKGROUND OF THE INVENTION

In building construction, utility signal lines are typically encased by a protective sheath to avoid damage from contact with other building components. Electrical cables are generally covered with a flexible cladding or conduit which carries a plurality of conductors throughout the building between terminal connections or junction boxes. The conductors are fed through an aperture in a support or junction box, and the conduit is fastened to the box to hold the conductors securely in place.

In the past, connectors such as threaded bushings or locking collars have been used to retain the electrical conduit in the support. Many of the connectors are secured in the aperture of the support by threads, which requires extra installation time to align and turn the connector in place. Other connectors snap in place and receive the side walls of the aperture in a preformed groove, which limits use of the connectors to certain wall thicknesses. Many connectors also have an excessive number of parts, for example, a bushing, a washer, and a separate clamping member, which complicate installation and increase cost.

One-piece connectors are generally formed of punched and folded sheet metal which has sharp edges and cannot seal the conduit to the junction box. To overcome the inability to form a seal, sheet metal conductors often extend into the junction box to secure the conduit sheathing far into the interior of the box. Thus, the junction boxes must be made larger and are crowded by protruding conduits and connectors.

Examples of these prior connectors are disclosed in the following patents: U.S. Pat. Nos. 2,093,038 to Douglas; 3,993,333 to Biswas; 3,154,281 to Frank; 3,814,467 to Van Buren, Jr.; 3,858,151 to Paskert; 4,012,578 to Moran et al.; 4,880,387 to Stikeleather et al.; 4,248,131 to Larro; 1,215,595 to Weikert et al.; 4,864,080 to Fochler et al.; 4,021,604 to Dola et al.; 3,183,297 to Curtiss; and 4,103,101 to Maier.

SUMMARY OF THE INVENTION

Accordingly, it is a primary object of the invention to provide a durable connector capable of securely coupling a flexible electrical conduit to a support.

Another object of the invention is to provide a simple connector that can be installed quickly and easily in one step.

Another object of the invention is to provide a connector that accommodates various thicknesses of the support wall, and thus provide versatility in application.

An additional object of the invention is to provide a connector that comes assembled as one piece to reduce the number of parts required for installation and to reduce the cost of assembly and production.

A further object of the invention is to provide a connector that provides a fluid-tight seal.

The foregoing objects are basically attained by providing a connector for coupling an electrical conduit to a support having an aperture, the combination comprising a tubular body member having a longitudinal axis and first and second ends and including a plurality of resilient legs with radially extending locking tongues thereon, the legs being located at the first end and being adapted to deflect to pass through the aperture, and a retaining assembly, adjacent the second end, for retaining the conduit therein; and a spring for biasing the body member away from the support when the spring engages the support, the spring being rigidly coupled to the body member between the first and second ends, whereby the locking tongues and spring engage opposed sides of the support adjacent the aperture.

Other objects, advantages, and salient features of the invention will become apparent from the following detailed description, which, taken in conjunction with the annexed drawings, discloses preferred embodiments of the invention.

DRAWINGS

Referring now to the drawings which form part of this original disclosure:

FIG. 1 is a side elevational view in partial longitudinal section of the connector clamped to a support in accordance with the invention with the electrical conduit inserted in the body member;

FIG. 2 is an exploded side elevational view of the connector of FIG. 1 with the spring member in longitudinal section;

FIG. 3 is a side elevational view of the body member of FIG. 2 in full longitudinal section;

FIG. 4 is a side elevational view in partial longitudinal section of a second embodiment of the connector clamped to a support;

FIG. 5 is a side elevational view in partial longitudinal section of a third embodiment of the connector clamped to a support; and FIG. 6 is a side elevational view in partial longitudinal section of a fourth embodiment of the connector clamped to a support in accordance with the invention.

DETAILED DESCRIPTION OF THE INVENTION

As seen in FIGS. 1-3, electrical connector 10 in accordance with the invention comprises a body member 12 rigidly coupled to a spring member 14. Body member 12 includes a plurality of resilient legs 16 on one end and a retaining formation 18 on the other end for coupling conduit 20 thereto. When connector 10 is installed in an aperture 19 in support 22, spring member 14 is biased against one side of the support and resilient legs 16 with locking tongues are biased against the other side of support 22, as seen in FIG. 1. Body member 12 and spring member 14 are preferably made of resilient, flexible plastic such as acetal, but may be made of any resilient material.

Body member 12 is a tubular, unitary one-piece member having first and second ends 23 and 25. A plurality of resilient, elongate legs 16 extend from the first end. Four legs are shown in FIGS. 1-3, but any number of legs, including two or more, may be provided. Each resilient leg 16 has a radially extending locking tongue 24 at its end. Each locking tongue 24 has an inwardly tapered sliding face 26 and a radially extending locking shoulder 28. Legs 16 protrude longitudinally at the first end of body member 12, are spaced in the circumferential direction, and fit within a preformed aperture 19, preferably circular, in support 22. Legs 16 are sufficiently resilient to deflect inwardly when sliding faces 26 abut the edges of the aperture 19 in support 22. The locking shoulders 28 on each tongue are contained in a single plane which is substantially perpendicular to the longitudinal axis A of the body member.

Retaining formation 18 at the second end of body member 12 in FIGS. 1-3 comprises an annular, axially extending recess 30. Inner annular wall 32, outer annular wall 34, and radially extending annular bottom wall 36 define annular recess 30. Seen in cross section in FIG. 3, annular recess 30 extends generally parallel to the longitudinal axis A of body member 12. Outer annular wall 34 is truncated, and therefore inner wall 32 extends outwardly from body member 12 beyond annular recess 30.

The edge of outer wall 34, adjacent the second end 25 of body member 12, has a radially extending lip formation 38 with a bevelled edge 40 tapering inwardly to body member 12. Adjacent the first end 23 of body member 12 is an axial, annular groove 42 extending radially inward. A bevelled edge 44 tapers from annular groove 42 to a radial stop shoulder 46. Resilient legs 16 extend from stop shoulder 46 at spaced intervals.

Located between lip formation 38 and annular groove 42 are a plurality of diametrically opposed locking tabs 48 and 50. Each locking tab has an interior protruding finger 53 and 52 respectively on the end thereof. Locking tabs 48 and 50 are formed from a cutout of the outer annular wall, and each has an integral hinge 54 which allows it to deflect outwardly. Adjacent each locking tab, between the pointed finger 53 and annular groove 42, as shown in FIG. 2, is a cutout opening 56 which accommodates the deflecting locking tab and provides visual access for inspection of conduit 20. Locking tabs 48 and 50 have different lengths to facilitate threading a helical conduit 20 within annular recess 30.

As seen in FIGS. 1 and 3, the interior of hollow body member is smooth and tubular which allows wires 58 located inside conduit 20 to extend entirely through connector 10. The tubular interior of body member 12, defined by annular inner wall 32, extends within conduit 20 to provide stability and enhance sealing.

Spring member 14, as seen in FIGS. 1-3, includes a continuous resilient annular flange 60 and hollow tubular sleeve 62. Flange 60 is frusto-conical and extends radially outward at an angle of about 65° from hollow sleeve 62.

Spring member 14 has a first edge 68 which is the rim of flange 60 and a second edge 66 which is the end of sleeve 62. Within hollow spring member 14 is an annular ring 64. Ring 64 is located within sleeve 62 adjacent the juncture of sleeve 62 and flange 60, as seen clearly in FIG. 2.

As discussed above, spring member 14, particularly flange 60, is made from resilient material, preferably acetal, commonly known for its spring-like characteristics.

Assembly

Connector 10 is provided as an integral unit, with body member 12 rigidly coupled to spring member 14. To assemble connector 10, body member 12 is inserted into spring member 14 through the end 66 of sleeve 62, as seen in FIG. 2. Upon insertion, resilient legs 16 deflect inwardly when pressed against annular ring 64. Bevelled edge 44 on body member 12 acts as a sliding surface for annular ring 64 as body member 12 is pushed further into spring member 14. Similarly, bevelled edge 40 adjacent lip 38 of body member 12 provides a sliding surface for end 66 of sleeve 62. After sliding over bevelled edge 44, annular ring 64 is snapped within annular groove 42 and held in a interlocking fit, as seen in FIG. 1. Lip 38 spaces sleeve 62 from body member 12 so that locking tabs 48 and 50 may deflect outwardly when conduit 10 is inserted in annular recess 30, as seen in FIG. 1. Thus coupled by the interlock of ring 64 and groove 42, body member 12 and spring member 14 are integrally connected.

As an assembled component, connector 10 is coupled to conduit 20 by inserting conduit 20 in annular recess 30 and engaging locking tabs 48 and 50. In the case of a helical outer sheath on conduit 20, the conduit may be pushed or rotated into annular recess 30.

Connector 10, coupled to conduit 20, is then inserted into aperture 19 in support 22 by pressing resilient legs 16 into the aperture. Upon pressing legs 16 into the aperture, sliding faces 26 will assist in deflecting legs 16 inwardly such that locking shoulders 28 can protrude from the opposed side of support 22. The plane containing locking shoulders 28 and the plane containing the edge 68 of spring flange 60 are parallel and spaced a distance less than the thickness "x" of support 22. Therefore, when connector 10 is inserted into the aperture 19 of support 22 and resilient legs 16 protrude through the aperture, spring flange 60 will bear against support 22 and compress to allow locking shoulders 28 to snap outwardly and engage the opposed side of support 22. Thus, when locking tongues 24 pass completely through the aperture on support 22, resilient legs 16 deflect outwardly, firmly clamping support 22 between locking shoulders 28 and biased spring member 14. Stop shoulder 46 prevents body member 12 from protruding into the junction box 22.

Since spring member 14 is coupled to body member 12 between the first and second ends 23 and 25 of body member 12, spring flange 60, in a biased state, forces body member 12 away from support 22. However, locking shoulders 28 are retained by the aperture edge in support 22 and therefore firmly couple body member 12 to the support 22. It is also possible to insert connector 10 in the aperture of support 22 before conduit 20 is retained within the retaining formation 18 of body member 12.

As seen in FIG. 1, only the locking tongues 24 of the connector protrude into the support 22. The spring member 14 and conduit 20 are positioned entirely outside of the support. Wires 58 will naturally pass through the hollow body member 12 into the junction box.

Since spring flange 60 is annular and tightly compressed against support 22, a seal is formed between connector 10 and the support 22. If the support is smooth-walled and even, as shown in the figures, the seal will be fluid-tight. Further, annular recess 30 including inner annular wall 32, which extends within conduit 20, ensures a fluid-tight connection between conduit 20 and connector 10. Therefore, wires 58 are shielded from the outside and pass from the conduit to the junction box through a sealed passage. In addition, a secondary sealing member 70 may be provided around resilient legs 16 for fluid-tight sealing protection for the wires 58. Sealing member 70 is configured as an annular foam sponge which compresses against stop shoulder 46 when connector 10 is inserted into the aperture of support 22.

Embodiment of FIG. 4

As shown in FIG. 4, connector 110 includes body member 112 and spring member 114. In this embodiment, body member 112 and spring member 114 are integrally molded as a one-piece, unitary member. Connector 110 is similar to connector 10, shown in FIGS. 1-3, and has a plurality of resilient legs 116 with locking tongues 124 on one end and a retaining formation 118 located on the second end.

Retaining formation 118 is an annular, axial recess 130 with an inner wall, extending within conduit 20 and therefore not shown in FIG. 4, and an outer wall 134. Outer wall 134 has a plurality of resilient locking tabs 148 and 150 integrally hinged from outer wall 134.

Spring member 114 includes a resilient, annular, frusto-conical flange 160 flaring outwardly from body member 112.

In this case, spring member 114 does not include a hollow sleeve extending from flange 160, since flange 160 is formed as one piece with body member 112.

Connector 110 is inserted into an aperture 19 in support 22 in the same manner as connector 10 described above. Resilient legs 116 are pressed within the aperture and flange 160 biases against support 22 allowing locking shoulders 128 to pass through the aperture, snap outwardly, and bear against support 22. Conduit 20 is threaded into retaining formation 118 either prior to or after insertion of connector 110 into the aperture in support 22.

Embodiment of FIG. 5

Connector 210 shown in FIG. 5 is also a unitary member, with body member 212 and spring member 214 formed as one piece. Flange 260 is again integrally molded with body member 212. Connector 210 has a plurality of resilient legs 216 with locking tongues 224 on one end, and a retaining formation 218 on the second end. In this embodiment, retaining formation 218 includes internal helical grooves 219. Conduit 20 is threadedly received in helical grooves 219 by rotating conduit 20 into body member 212.

Connector 210 is inserted in aperture of support 22 in a manner similar to the connector of FIG. 4 by inserting legs 216 in the aperture and biasing flange 260 against support 22.

If desired, connector 210 could be formed in two pieces with spring member 214 being rigidly coupled to body member 212 in a manner similar to that described in reference to FIGS. 1-3 with an interlocking connection.

Embodiment of FIG. 6

As shown in FIG. 6, connector 310 includes body member 312 and spring member 314 formed as a unitary, one-piece integral member. Resilient legs 316 are located at one end of body member 312 and retaining formation 318 is located at the second end.

In this embodiment, retaining formation 318 includes an annular, axial recess 330 having an inner wall 332 and an outer wall 334 extending generally parallel to the longitudinal axis. A bend control tail 319 in the form of a helical coil extends from the second end of body member 312 and is integrally formed therewith. Bend control tail 319 is adapted to wrap around a conduit 20 having a helically wrapped sheath. Bend control tail 319 can vary in length depending on the amount of support desired for conduit 20.

Upon assembly, conduit 20 is rotated within bend control tail 319 to extend into annular recess 330 and abut bottom wall 336 of annular recess 330. Bend control tail 319 is sufficiently resilient to support conduit 20 while absorbing exterior stresses experienced by the conduit.

Again, connector 310 is inserted into an aperture in support 22 by pressing resilient legs 316 into the aperture and biasing flange 360 of spring member 314 against the support 22.

Connector 310 may also be made of two members, body member 312 and spring member 314, by rigidly coupling them together with a ring and groove arrangement as discussed in reference to FIGS. 1-3.

As seen in FIGS. 1, 4, 5 and 6, support 22 may vary in thickness "x". Connector 10 and the other described embodiments of the connector will accommodate variable thicknesses of support due to the ability of spring member 14 to deflect away from and compress against support wall 22.

Additionally, all of the above described embodiments provide the sealing advantage discussed with respect to flange 60 by tightly bearing against the support 22 and completely covering all sides of the aperture into which the connector is inserted. Additionally, sealing member 70 may be utilized with each of the embodiments shown in FIGS. 1-6. It is also possible to provide bend control tail 319 on the embodiments of FIGS. 1, 4 and 5 if additional support for conduit 20 is desired.

While advantageous embodiments have been chosen to illustrate the invention, it will be understood by those skilled in the art that various changes and modifications can be made therein without departing from the scope of the invention as defined in the appended claims.

What is claimed is:

1. A connector for coupling an electrical conduit to a support having an aperture, the combination comprising:
    a tubular body member having a longitudinal axis and first and second ends and including
        a plurality of resilient legs extending outwardly from said first end and being adapted to deflect to pass through the aperture, said legs having locking tongues extending radially outwardly therefrom and
        retaining means, adjacent said second end, for retaining the conduit therein; and
    spring means for biasing said body member away fom the support, said spring means being rigidly coupled to said body member between said first and second ends and flaring outwardly from a second edge to a first edge, said first edge engaging the support and said second edge being immediately adjacent said legs,
    whereby said locking tongues and spring means engage opposed sides of the support adjacent the aperture.

2. A connector according to claim 1, wherein said spring means is integral with said body member.

3. A connector according to claim 1, wherein said spring means is formed of acetal.

4. A connector according to claim 1, wherein
    said spring means is integrally molded as one piece with said body member.

5. A connector according to claim 1, wherein
said spring means is continuous and forms a liquid-tight seal between said connector and the support.

6. A connector according to claim 1, wherein
each of said locking tongues has a tapered outer face, angled toward said longitudinal axis, and a locking shoulder extending radially outwardly from said leg and meeting said outer face.

7. A connector according to claim 1, wherein said retaining means comprises
internal receiving grooves for coupling said body member to the conduit.

8. A connector according to claim 1, wherein said retaining means comprises
at least one annular recess extending substantially coaxially with said longitudinal axis and forming an inner wall and an outer wall, said recess adapted to receive the conduit.

9. A connector according to claim 8, wherein said outer wall is truncated.

10. A connector according to claim 8, wherein
said inner wall extends longitudinally away from said resilient legs and beyond said outer wall.

11. A connector according to claim 8, wherein
said outer wall has at least one resilient locking tab.

12. A connector according to claim 11, wherein
said locking tab is integrally formed with said outer wall.

13. A connector according to claim 11, wherein
said locking tab is hinged to said outer wall.

14. A connector according to claim 11, wherein
said locking tab has a finger protruding into said recess for engagement with the conduit.

15. A connector according to claim 1, wherein said retaining means comprises
a resilient, helical coil tail coupled to said second end and extending away from said body member, said tail being adapted to wrap around the conduit.

16. A connector according to claim 1, and further comprising
sealing means for forming a fluid-tight connection between the conduit and the support.

17. A connector according to claim 16, wherein said sealing means comprises
a sealing member disposed around said resilient legs for sealing between said body member and the support.

18. A connector for coupling an electrical conduit to a support having an aperture, the combination comprising:
a tubular body member having a longitudinal axis and first and second ends and including
a plurality of resilient legs with radially extending locking tongues thereon, said legs being located at said first end and being adapted to deflect to pass through the aperture, and
retaining means, adjacent said second end, for retaining the conduit therein; and
spring means for biasing said body member away from the support when said spring means engages the support, said spring means being rigidly coupled to said body member between said first and second ends
whereby said locking tongues and spring means engage opposed sides of the support adjacent the aperture, and
wherein said spring means comprises a resilient annular flange coupled to and extending from a hollow sleeve surrounding said body member.

19. A connector according to claim 18, wherein
said sleeve has a radially inwardly extending annular ring.

20. A connector according to claim 19, wherein said body member comprises
an annular radially extending groove between said first and second ends, said ring engaging said groove in an interlocking fit.

21. A connector for coupling an electrical conduit to a support having an aperture, the combination comprising:
a tubular body member having a longitudinal axis and first and second ends and including
a plurality of resilient legs extending outwardly from said first end and being adapted to deflect to pass through the aperture, said legs having locking tongues extending radially outwardly therefrom and
retaining means, adjacent said second end, for retaining the conduit therein;
spring means for biasing said body member away from the support when said spring means engages the support; and
means, located on said spring means and said body member, for rigidly coupling said spring means to said body member between said first and second ends to prevent relative translational movement therebetween,
whereby said locking tongues and spring means engage opposed sides of the support adjacent the aperture.

22. A connector according to claim 21, wherein
said spring means is frustoconical.

23. A connector according to claim 22, wherein
said frustoconical spring means flares outwardly from said body member at a substantially constant angle.

24. A connector according to claim 21, wherein
said means for rigidly coupling comprises a ring, and a groove for rigidly receiving said ring.

25. A connector according to claim 21, wherein
said means for rigidly coupling comprises an integral connection between said spring means and said body member.

* * * * *